United States Patent
Liphardt et al.

(10) Patent No.: US 11,791,483 B2
(45) Date of Patent: Oct. 17, 2023

(54) METHOD FOR STARTING A FUEL CELL DEVICE UNDER FROST STARTING CONDITIONS AND A FUEL CELL DEVICE AND MOTOR VEHICLE

(71) Applicant: AUDI AG, Ingolstadt (DE)

(72) Inventors: Leonard Liphardt, Mainhardt (DE); Sebastian Disson, Waghäusel (DE); Keigo Suematsu, Neckarsulm (DE); Francisco Javier Valbuena Encinas, Stuttgart (DE)

(73) Assignee: Audi AG, Ingolstadt (DE)

( * ) Notice: Subject to any disclaimer, the term of this patent is extended or adjusted under 35 U.S.C. 154(b) by 56 days.

(21) Appl. No.: 17/607,347

(22) PCT Filed: Jan. 30, 2020

(86) PCT No.: PCT/EP2020/052215
§ 371 (c)(1),
(2) Date: Oct. 28, 2021

(87) PCT Pub. No.: WO2020/221480
PCT Pub. Date: Nov. 5, 2020

(65) Prior Publication Data
US 2022/0223886 A1 Jul. 14, 2022

(30) Foreign Application Priority Data
Apr. 29, 2019 (DE) ...................... 10 2019 206 119.2

(51) Int. Cl.
*H01M 8/04225* (2016.01)
*H01M 8/04302* (2016.01)
(Continued)

(52) U.S. Cl.
CPC ... *H01M 8/04225* (2016.02); *H01M 8/04253* (2013.01); *H01M 8/04302* (2016.02);
(Continued)

(58) Field of Classification Search
CPC ......... H01M 8/04225; H01M 8/04253; H01M 8/04302; H01M 8/04552; H01M 8/04753;
(Continued)

(56) References Cited

U.S. PATENT DOCUMENTS

| | | |
|---|---|---|
| 10,038,205 B2 | 7/2018 | Wake et al. |
| 2012/0114980 A1 | 5/2012 | Lundblad |
| 2013/0244125 A1* | 9/2013 | Wake ................ H01M 8/04761 429/415 |

FOREIGN PATENT DOCUMENTS

| | | |
|---|---|---|
| DE | 112008000628 T5 | 12/2009 |
| DE | 112008003072 T5 | 9/2010 |

(Continued)

OTHER PUBLICATIONS

International Search Report, dated Apr. 23, 2020, for International Application No. PCT/EP2020/052215, 4 pages.
(Continued)

*Primary Examiner* — Matthew W Van Oudenaren
(74) *Attorney, Agent, or Firm* — SEED INTELLECTUAL PROPERTY LAW GROUP LLP

(57) ABSTRACT

A method for starting a fuel cell device having a plurality of fuel cells under frost starting conditions is provided, which comprises: establishing the presence of frost starting conditions for the fuel cell device, anode-side supplying of a hydrogen-containing reactant and cathode-side supplying of an oxygen-containing reactant in a sub-stoichiometric ratio with an oxygen deficit, maintaining the supply of the reactants in a sub-stoichiometric ratio for a given interval of time, after elapsing of the interval of time, causing the complete discharging of the fuel cells in a discharge phase, and then converting the fuel cell device to a normal mode with the supplying of the reactants according to the requirements for the given operating state and the power demand.

(Continued)

A fuel cell device and a motor vehicle are also provided for carrying out such a method.

9 Claims, 3 Drawing Sheets

(51) Int. Cl.
 *H01M 8/04223* (2016.01)
 *H01M 8/04537* (2016.01)
 *H01M 8/04746* (2016.01)

(52) U.S. Cl.
 CPC ... *H01M 8/04552* (2013.01); *H01M 8/04753* (2013.01); *H01M 2250/20* (2013.01)

(58) Field of Classification Search
 CPC .......... H01M 8/0432; H01M 8/04097; H01M 8/04037; H01M 8/04268; H01M 8/04559; H01M 8/04582; H01M 8/04589; H01M 8/04611; H01M 8/04619; H01M 8/04701; H01M 8/04873; H01M 8/0488; H01M 8/04902; H01M 8/0491; H01M 8/04932; H01M 8/0494; H01M 2250/20
 See application file for complete search history.

(56) References Cited

FOREIGN PATENT DOCUMENTS

| | | |
|---|---|---|
| DE | 112008003476 T5 | 10/2010 |
| DE | 112010000819 T5 | 5/2012 |
| DE | 112009004990 T5 | 11/2012 |
| DE | 10297626 B4 | 4/2013 |
| DE | 102013204455 A1 | 9/2013 |
| DE | 102013211913 A1 | 1/2014 |
| DE | 102014217881 A1 | 6/2015 |
| EP | 2086042 A1 | 8/2009 |

OTHER PUBLICATIONS

International Preliminary Report on Patentability, dated Apr. 23, 2020, for International Application No. PCT/EP2020/052215, 6 pages.

* cited by examiner

METHOD FOR STARTING A FUEL CELL DEVICE UNDER FROST STARTING CONDITIONS AND A FUEL CELL DEVICE AND MOTOR VEHICLE

BACKGROUND

Technical Field

Embodiments of the invention are formed by a method for starting a fuel cell device having a plurality of fuel cells under frost starting conditions, involving the steps of establishing the presence of frost starting conditions for the fuel cell device, anode-side supplying of a hydrogen-containing reactant and cathode-side supplying of an oxygen-containing reactant in a sub-stoichiometric ratio with an oxygen deficit, maintaining the supply of the reactants in a sub-stoichiometric ratio for a given interval of time, after elapsing of the interval of time causing the complete discharging of the fuel cells in a discharge phase, and then converting the fuel cell device to a normal mode with the supplying of the reactants according to the requirements for the given operating state and the power demand. Embodiments of the invention furthermore relate to a fuel cell device and a motor vehicle.

Description of the Related Art

Fuel cell devices, especially when they are used in mobile units such as motor vehicles, may be subjected to varying ambient conditions; in particular, the ambient temperature is significant for the operation of the fuel cell device, including its starting and stopping. Namely, if frost conditions are present at the starting of the fuel cell device, of if frost conditions are to be expected during a subsequent starting, suitable steps must be taken to avoid ice blockage in the fuel cell stack formed by a multitude of fuel cells, since ice blockage may impair or even totally block the supply of the reactants, i.e., the hydrogen-containing fuel and the oxygen-containing gas, especially air. Suitable steps are known for avoiding ice blockage, including the drying of the fuel cell stack upon shutting off the fuel cell device; but ice blockage may also occur when product water freezes, having been produced upon the starting of the fuel cell device. Suitable measures are also known for preventing the freezing of product water by the use of suitable frost start strategies.

One possibility for eliminating ice blockage is to provide an adequate heating, especially by the fuel cell device itself, where only a low electrical power needs to be generated. This may be accomplished by a low efficiency of the fuel cells, wherein the air mass flow is reduced during the usual providing of oxygen from the air. In this way, the region in the current/voltage diagram which is dominated by the transport resistance is shifted toward lower current, where the ohmic region is dominant, as represented in FIG. 5.

A reduction of the air mass flow is disclosed in U.S. Pat. No. 10,038,205 B2, which specifies that a reduced supply of air occurs during a starting at low temperatures by a throttling of the compressor, while a replacement gas flow with little air is provided by opening a valve.

DE 102 97 626 B4 discusses the procedure during an air/air start, the starting method also calling for a recirculating of the vent gas of the anode flow field, which is initially filled with air and then is enriched with fuel.

A problem exists when starting a fuel cell device under frost starting conditions with a reduced air mass flow to lower the efficiency, namely, there are slight mass and volume flows, so that water cannot be drained from the gas channels of the cathode. Therefore, liquid water collects there and impairs the gas distribution in the gas channels, resulting in very high and very low individual cell voltages on account of electrochemical effects, and the high cell voltages in particular are a factor in the degradation of the electrodes.

BRIEF SUMMARY

Embodiments of the invention decrease or even avoid unwanted voltage differences in the individual cells of a fuel cell device during a method for starting a fuel cell device under frost starting conditions. Some embodiments also provide an improved fuel cell device and an improved motor vehicle.

In the method for starting a fuel cell device having a plurality of fuel cells under frost starting conditions, first of all the presence of frost starting conditions for the fuel cell device is established, i.e., it is determined whether frost starting conditions can be confirmed with the aid of internal or external parameters, which need not be the case even at subzero outdoor temperatures if a motor vehicle with warm fuel cell device is halted only briefly. In the event that frost starting conditions are present, there then occurs an anode-side supplying of a hydrogen-containing reactant and a cathode-side supplying of an oxygen-containing reactant in a sub-stoichiometric ratio with an oxygen deficit in order to operate the fuel cell device with a low efficiency for the generating of heat. The supply of the reactants in a sub-stoichiometric ratio is then maintained for a given interval of time and after the elapsing of the interval of time the complete discharging of the fuel cells is brought about in a discharge phase. The fuel cell device is then converted to a normal mode with the supplying of the reactants according to the requirements for the given operating state and the power demand. As a result of the discharge phase, all of the individual cells of the fuel cell device have been set at a common potential, so that a uniform oxygen supply in the normal mode results in a consistent cell voltage of all the individual cells.

The complete discharging of the fuel cells may be produced by stopping the supplying of the oxygen-containing reactant from the reactant source and all of the oxygen in the fuel cell is consumed, and optionally the oxygen-containing reactant is recirculated and the oxygen is progressively consumed.

It is important that no new problems can occur after the discharge phase with the providing of a common target potential, due to blockages in the gas channels, i.e., the heating must have advanced sufficiently. This is ensured in that the interval of time is dimensioned in dependence on the specific given frost starting conditions so that by the end of the interval of time blockages in the supply and reaction pathways of the reactants are eliminated.

Also, the possibility also exists in the new method of promoting the heating of the fuel cell device prior to the discharge phase, in that air is used as the oxygen-containing reactant and the supplying of the oxygen-containing reactant occurs in a sub-stoichiometric ratio by decreasing the air mass flow.

Further, it may be advantageous for the discharge phase to be maintained until such time as all the fuel cells have a common electrical potential and possess the same target voltage in the normal mode, so that there is also a criterion for determining the length of the discharge phase.

The improved fuel cell device for carrying out the method is characterized in that a control unit is provided for the starting and the ending of the discharge phase, and this control unit may also be integrated in the controls of the device.

The new motor vehicle having an improved fuel cell device operating by the method described herein shows less overall wear or degradation and has higher efficiency.

BRIEF DESCRIPTION OF THE SEVERAL VIEWS OF THE DRAWINGS

Further benefits, features and details will emerge from the claims, the following description of embodiments, and the drawings.

DETAILED DESCRIPTION

A fuel cell device generally comprises a fuel cell stack, having a multitude of fuel cells switched in series.

Each of the fuel cells comprises an anode and a cathode as well as a proton-conducting membrane separating the anode from the cathode. The membrane is formed from an ionomer, such as a sulfonated tetrafluorethylene polymer (PTFE) or a polymer of perfluorinated sulfonic acid (PFSA). Alternatively, the membrane may be formed as a sulfonated hydrocarbon membrane.

A catalyst may be mixed in with the anodes and/or the cathodes in addition, the membranes being coated on their first side and/or on their second side with a catalyst layer of a precious metal or mixtures comprising precious metals such as platinum, palladium, ruthenium or the like, which serve as reaction accelerants for the reaction of the particular fuel cell.

Fuel (such as hydrogen) is supplied to the anodes through anode spaces within the fuel cell stack. In a polymer electrolyte membrane fuel cell (PEM fuel cell), fuel or fuel molecules are split into protons and electrons at the anode. The membrane lets the protons (such as $H^+$) pass through, but is impervious to the electrons ($e^-$). The following reaction occurs at the anode: $2H_2 \rightarrow 4H^+ + 4e^-$ (oxidation/electron surrender). While the protons pass through the membrane to the cathode, the electrons are taken by an external circuit to the cathode or to an energy accumulator. Cathode gas (such as oxygen or air containing oxygen) can be supplied to the cathodes through cathode spaces within the fuel cell stack, so that the following reaction takes place at the cathode side: $O_2 + 4H^+ + 4e^- \rightarrow 2H_2O$ (reduction/electron uptake).

If frost starting conditions are present at the starting of a fuel cell device, there is a danger that channels in the fuel cell stack formed by a multitude of fuel cells for the supplying of the reactants will be blocked by ice, which may be formed by an inadequate drying of the fuel cell stack when the fuel cell device was switched off or by freezing of the product water upon starting of the fuel cell device. If a blockage is present on the anode side, a hydrogen depletion will occur, resulting in a deep pole reversal, causing irreversible damage to the membrane electrode arrangement due to carbon corrosion.

Figure 5:
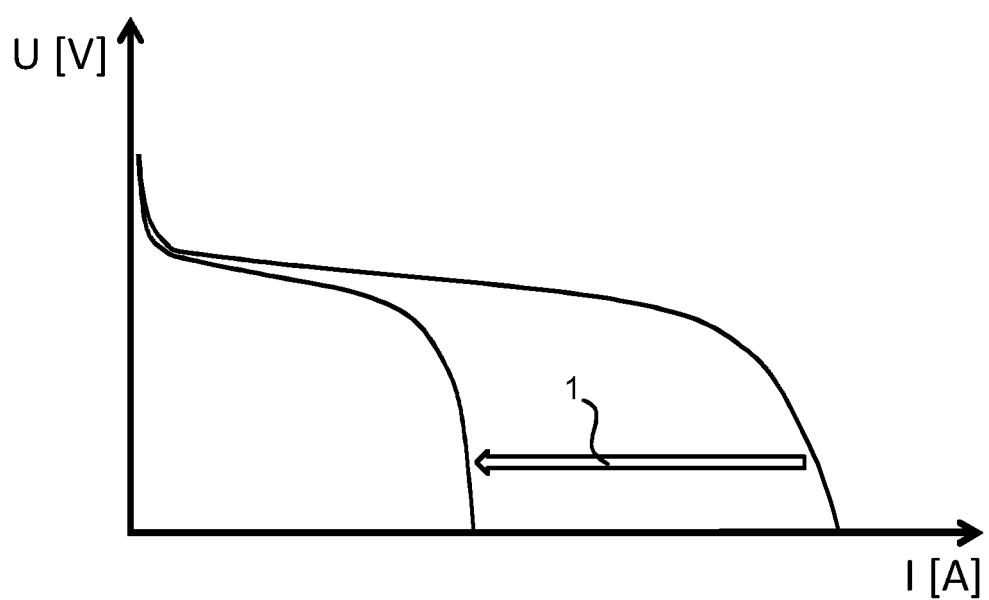
FIG. 5 shows a schematic representation of the influence of the air mass depletion during a frost start.

Any blockage which is present can be loosened up by providing adequate heating power by the fuel cell device, which should produce a lot of heat for this and must provide only slight electrical power. This corresponds to an operation with a decreased efficiency, which can be achieved when air is used as the oxygen-containing reactant and the supply of the oxygen-containing reactant occurs in a sub-stoichiometric ratio by decreasing the air mass flows 1 (see FIG. 5).

Figure 1:
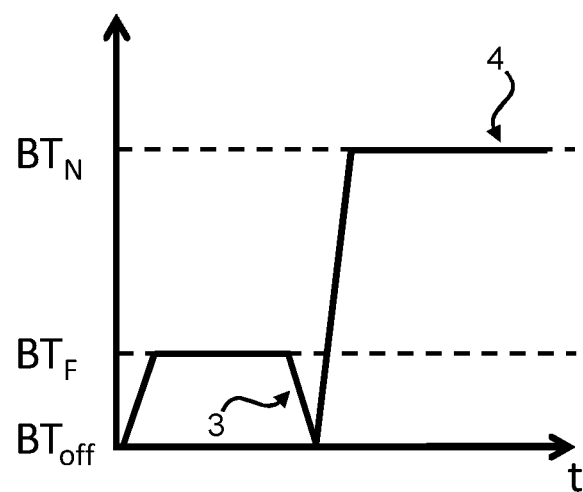
FIG. 1 shows a time-dependent representation (time t) of the start of a fuel cell device during frost starting conditions with the load change required for this, including the discharge phase, where the frost start operation is shown hatched with $BT_F$, the normal operation with $BT_N$ and the switched-off fuel cell device with $BT_{off}$ along the ordinate.
Figure 2:
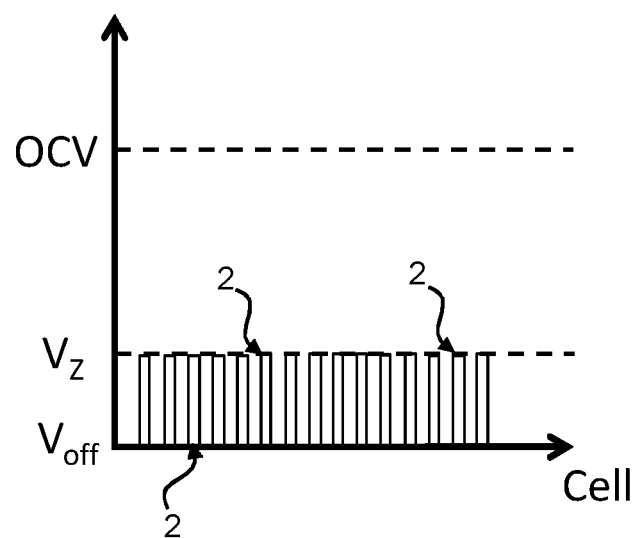
FIG. 2 shows the cell voltage diagram for all individual cells (Cell) after the end of the discharge phase and the transition to the normal mode, where the idle voltage is marked with OCV and the target voltage with $V_Z$ along the ordinate.
Figure 3:
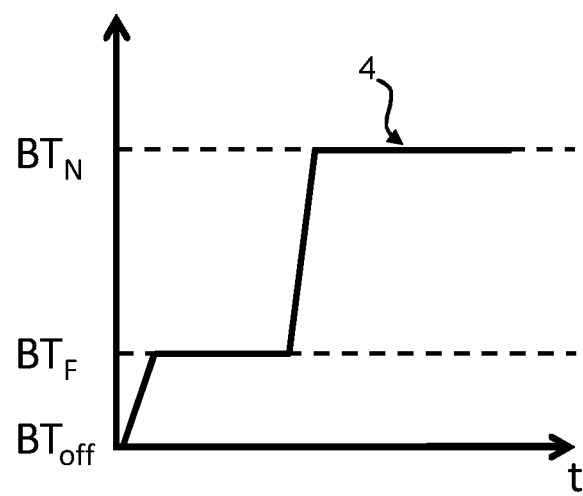
FIG. 3 shows a representation corresponding to FIG. 1 for another method.
Figure 4:
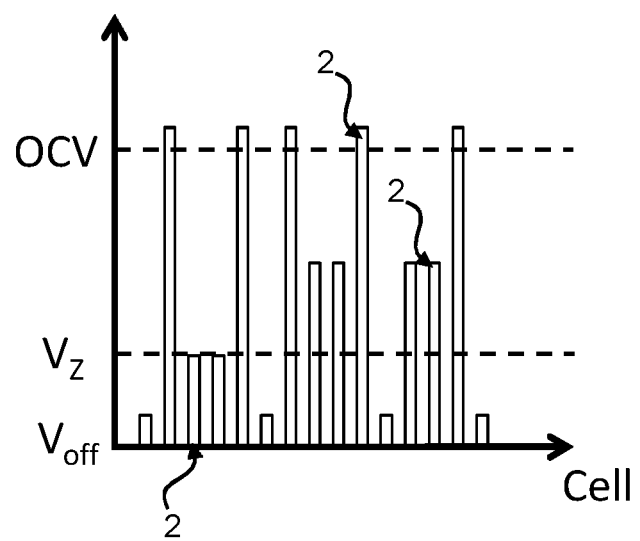
FIG. 4 shows a representation corresponding to FIG. 2 of a cell voltage diagram during a load change.

The detrimental consequences of this mode of operation which are evident in FIGS. 3 and 4, namely, greatly different individual cell voltages 2, are avoided by using a method for starting a fuel cell device with a plurality of fuel cells under frost starting conditions that involves the steps of establishing the presence of frost starting conditions for the fuel cell device, anode-side supplying of a hydrogen-containing reactant and cathode-side supplying of an oxygen-containing reactant in a sub-stoichiometric ratio with an oxygen deficit, maintaining the supply of the reactants in a sub-stoichiometric ratio for a given interval of time, after elapsing of the interval of time causing the complete discharging of the fuel cells in a discharge phase 3, and then converting the fuel cell device to a normal mode 4 with the supplying of the reactants according to the requirements for the given operating state and the power demand.

The complete discharging of the individual cells 2 is produced by halting the supply of the oxygen-containing reactant from the reactant source and consuming the entire oxygen in the fuel cell, or optionally by recirculating the oxygen-containing reactant and progressively consuming the oxygen.

In order to make sure that no more blockage is present upon switching to the normal mode 4, the interval of time is dimensioned in dependence on the specific given frost starting conditions so that by the end of the interval of time blockages in the supply and reaction pathways of the reactants are eliminated and in particular all the fuel cells 2 have a common electrical potential and possess the same target voltage in the normal mode.

The improved fuel cell device has a control unit with which the starting and the ending of the discharge phase is controlled in order to carry out the method, while the control unit may be integrated in the controls of the device.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for starting a fuel cell device having a plurality of fuel cells under frost starting conditions, comprising:

establishing a presence of frost starting conditions for the fuel cell device;

anode-side supplying of a hydrogen-containing reactant and cathode-side supplying of an oxygen-containing reactant in a sub-stoichiometric ratio with an oxygen deficit;

maintaining the anode-side supplying of the hydrogen-containing reactant and cathode-side supplying of the oxygen-containing reactant in a sub-stoichiometric ratio for a given interval of time;

after elapsing of the given interval of time, causing complete discharging of the fuel cells in a discharge phase; and thereafter, converting the fuel cell device to a normal mode with supplying of the reactants according to requirements for a given operating state and power demand.

2. The method according to claim 1, wherein the complete discharging of the fuel cells is produced by stopping the supplying of the oxygen-containing reactant from a reactant source and all oxygen in the fuel cells is consumed.

3. The method according to claim 2, wherein the oxygen-containing reactant is recirculated and the oxygen in the fuel cells is progressively consumed.

4. The method according to claim 1, wherein the given interval of time is dimensioned in dependence on specific given frost starting conditions so that by an end of the given interval of time blockages in supply and reaction pathways of the reactants are eliminated.

5. The method according to claim 1, wherein air is used as the oxygen-containing reactant and the supplying of the oxygen-containing reactant occurs in a sub-stoichiometric ratio by decreasing an air mass flow.

6. The method according to claim 1, wherein the discharge phase is maintained until such time as all the fuel cells have a common electrical potential and possess a common target voltage in the normal mode.

7. A fuel cell device configured to perform a method of starting the fuel cell device under frost starting conditions, the fuel cell device having a plurality of fuel cells, the method including establishing a presence of frost starting conditions for the fuel cell device, anode-side supplying of a hydrogen-containing reactant and cathode-side supplying of an oxygen-containing reactant in a sub-stoichiometric ratio with an oxygen deficit, maintaining the anode-side supplying of the hydrogen-containing reactant and cathode-side supplying of the oxygen-containing reactant in a sub-stoichiometric ratio for a given interval of time, after elapsing of the given interval of time, causing complete discharging of the fuel cells in a discharge phase, and, thereafter, converting the fuel cell device to a normal mode with supplying of the reactants according to requirements for a given operating state and power demand, the fuel cell device comprising:

a control unit for starting and ending the discharge phase.

8. The fuel cell device according to claim 7, wherein the control unit is integrated in controls of the fuel cell device.

9. A motor vehicle having a fuel cell device configured to perform a method of starting the fuel cell device under frost starting conditions, the fuel cell device having a plurality of fuel cells, the method including establishing a presence of frost starting conditions for the fuel cell device, anode-side supplying of a hydrogen-containing reactant and cathode-side supplying of an oxygen-containing reactant in a sub-stoichiometric ratio with an oxygen deficit, maintaining the anode-side supplying of a hydrogen-containing reactant and cathode-side supplying of an oxygen-containing reactant in a sub-stoichiometric ratio for a given interval of time, after elapsing of the given interval of time, causing complete discharging of the fuel cells in a discharge phase, and, thereafter, converting the fuel cell device to a normal mode with supplying of the reactants according to requirements for a given operating state and power demand, the fuel cell device comprising:

a control unit for starting and ending the discharge phase.

\* \* \* \* \*